May 6, 1924.  
F. C. BARTON  
COUPLING  
Filed Jan. 30, 1920
1,493,232
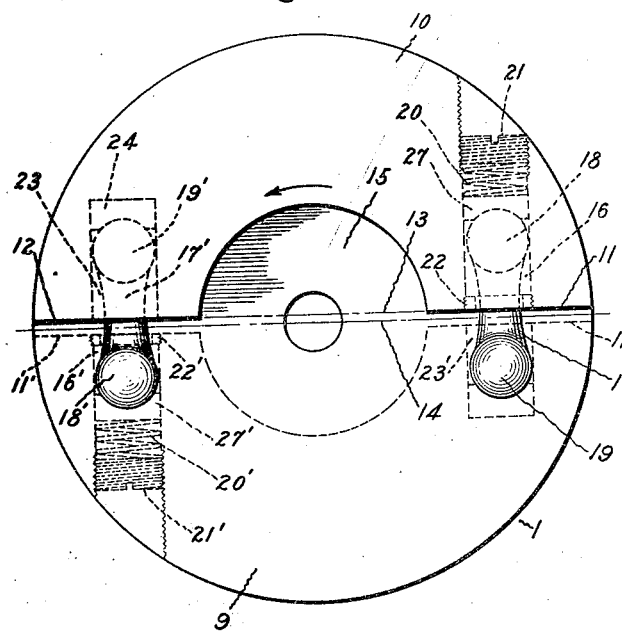
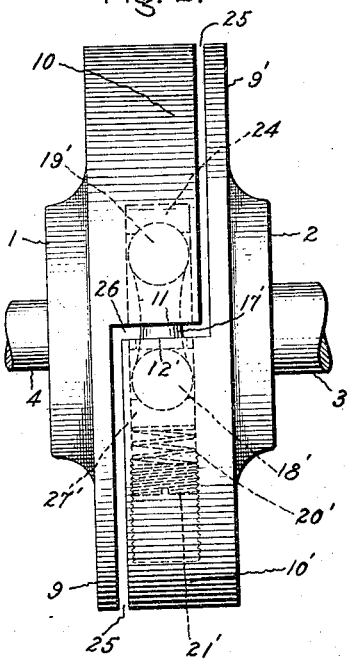
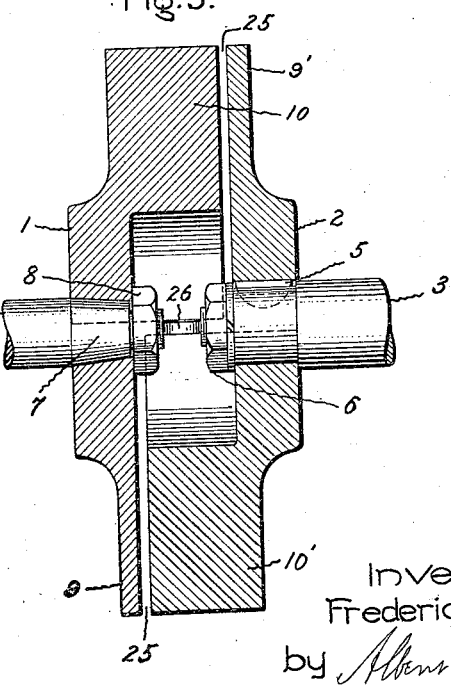
Inventor:  
Frederick C. Barton,  
by *Albert G. Davis*  
His Attorney.

Patented May 6, 1924.

1,493,232

UNITED STATES PATENT OFFICE.

FREDERICK C. BARTON, OF SCHENECTADY, NEW YORK, ASSIGNOR TO GENERAL ELECTRIC COMPANY, A CORPORATION OF NEW YORK.

COUPLING.

Application filed January 30, 1920. Serial No. 355,119.

*To all whom it may concern:*

Be it known that I, FREDERICK C. BARTON, a citizen of the United States, and a resident of Schenectady, in the county of Schenectady and State of New York, have invented certain new and useful Improvements in Couplings, of which the following is a specification.

This invention relates to couplings particularly to such as are used for transmitting power between substantially aligned shafts.

One of the objects is to provide a coupling of the above type which shall be simple, short and rugged in construction.

Another object is to provide apparatus of the type mentioned which shall be effective for its purpose though the shafts are not aligned with great accuracy, whether they are relatively displaced laterally or angularly or are disposed in slightly different planes.

Another object is to provide apparatus of the type referred to which shall satisfactorily transmit the torque between shafts inaccurately aligned in any of the manners above indicated, while preventing any appreciable relative displacement between the shafts in the direction of rotation.

Other objects will be in part obvious and in part pointed out hereinafter.

The invention has its preferred application to the driving of a magneto through the shaft of some other engine accessory as a generator or pump, or directly from an engine shaft. It is difficult to align the magneto shaft with great accuracy with respect to the shaft from which it is driven, but it is important to maintain accurate timing of the magneto. By the use of my coupling the timing of a magneto is accurately preserved even though the magneto shaft is not accurately aligned with the driving shaft.

In the accompanying drawings in which is shown one of various possible embodiments of the several features of this invention, Fig. 1 is a face view of one of the coupling collars, the other collar being indicated in dotted lines, Fig. 2 is a side view of the coupling in use and Fig. 3 is a view in transverse section of the coupling applied.

Similar reference characters refer to similar parts throughout the several views of the drawings.

Referring now to the drawings I have shown a coupling comprising two shaft collars 1 and 2 substantially identical in construction. These collars are adapted to be secured one to a driving shaft 3 and the other to a driven shaft 4 which in the preferred application is that of a magneto. As best shown in Fig. 3 the collar may be secured upon the shaft 3 against rotation, as for instance, by a Woodruff key 5, and held against axial displacement by a nut 6 threaded upon the end of shaft 3. The magneto shaft by way of example has the usual tapered end 7 upon which the collar 1 is telescoped, a nut 8 threaded upon the end of the shaft 4 serving to securely wedge the tapered shaft end 7 into a corresponding opening in the collar 1. It will be understood that the means for securing the two shaft collars in place is shown merely by way of illustration. Each collar by preference comprises a disk 9 having an integral upstanding ledge 10 which is in the shape of a segment of an annulus and which preferably terminates in shoulders 11—12 both along the same chord 13 of the circular rim 9, said chord being in proximity to the parallel diameter 14 of said rim.

From another point of view, the ledge may be considered as in the shape of a cylindrical segment 10 having a portion 15 cut away near its center to allow clearance for the driving and driven shaft ends and the nuts 6 and 8 as will be apparent from Fig. 3. Obviously the clearance space or cut away portion 15 need not have the arcuate contour shown.

As above noted the two shaft collars are substantially identical in construction and in the drawings, the corresponding parts of collar 2 will be designated by the same reference numerals as those of collar 1 except that the numerals of collar 2 will be primed.

A driving means is interposed between the ledges 10 and 10' to transmit the rotary impulse from the driving to the driven collar. For this purpose by preference I provide in the ledge 10 of the collar 1 a socket 16 extending at right angles to the shoulder 11 and closed at its outer end by a nut 21. I provide a link element 17 having preferably ball-shaped ends 18 and 19, the end 18 extending into the socket and the end 19 projecting beyond the ledge. By preference the ball-end 18 rests in a concave slidable seat 27 within the socket, a coil spring 20 being interposed between said seat and the nut 21. By preference an annular nut 22 is threaded into the end of the socket adjacent shoulder 11 to prevent removal of the link from the socket without interfering with the universal movement thereof. In the other shoulder 12 of the ledge I provide a socket 23 having a concave seat 24 fixed therein for lodging the free end 19' of a link 17' similar to link 17 and disposed in collar 2 in the same manner as link 17 is disposed in collar 1.

To apply my coupling for driving a magneto, the shaft collar 2 is keyed to the driving shaft 3 as shown in Fig. 3 and the shaft collar 1 is wedged upon the tapered shaft end of the magneto. The magneto is then held over the place upon the engine where it is to rest and moved downwardly to bring the shaft ends into approximate alignment as shown in Fig. 3. In this process the upstanding link end in the ledge 10 will readily enter the socket 23' and the downwardly extending link end 19' on the collar 2 will readily enter the socket 23. The magneto is then bolted in place in the usual manner.

The height or thickness of ledges 10 and 10' is preferably such that when the magneto is mounted in proper position a gap 25 will be present between the rim 9 and the ledge 10' and a similar gap between the rim 9' and ledge 10. By reason of the fact that the shoulders 11—12 and 11'—12' extend along chords and not along diameters there will be also a gap 26 between these shoulders when the device is in the assembled position shown in the drawings. The purpose of these gaps will fully appear in the description of the operation below.

In use the collar 2 is driven from the shaft 3 and by reason of the setting of link end 19' within socket 23 the rotary impulse in the direction of the arrow shown in Fig. 1 will be drivingly transmitted axially through the link, through the spring 20' to the collar 1. The parts remain in balanced relation as the link 17 returns the driving impulse from near the end 12' of ledge 10' to near the end 11 of ledge 10. It will thus be seen that the links act as the means for imparting a balanced rotary impulse from the driving to the driven shaft collar.

In the process of applying the coupling, the shafts 3 and 4 need not be accurately aligned but may be displaced at a slight angle with respect to each other. The gaps 25 readily permit a sufficient angular displacement between collars 1 and 2 to allow application in such case. In view of the capability of universal movement of the ball-ended links the latter will readily adjust themselves to this misalignment. The coupling will also take care of lateral misalignment, as the gaps 26 permit a parallel relative displacement of the collars 1 and 2.

My coupling may also be readily applied if the shafts are both laterally and angularly displaced with respect to each other, that is if the shafts should be disposed in slightly different planes. In all these possible cases of inaccuracy of alignment the couplings are adapted to be mounted in place with facility, the gaps 25 and 26 automatically taking up the inaccuracies in shaft alignment. In all these cases the links will efficiently transmit the torque. The gaps 25 and 26 are of course made sufficiently wide to prevent direct contact between ledges 10 and 10' even if the driving and driven shafts are misaligned to the maximum degree encountered in ordinary practice.

Springs 20 and 20' also contribute toward a noiseless and shockless operation.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters-Patent is:—

1. The combination in a coupling, of a pair of substantially identical shaft collars, each provided with a pair of aligned shoulders between the center and the periphery thereof, each shoulder on one said collar facing one of the shoulders on the other, a pair of links drivingly connecting said collars, one said link being disposed between each pair of facing shoulders, and a pair of coil springs one associated with one of the ends of each said link.

2. The combination in a coupling, of a pair of shaft collars each having a circular rim, a pair of shoulders on each said rim, the shoulders on each rim being disposed on a chord thereof whereby each shoulder on one said rim faces one of the shoulders on the other, a socket in each said shoulder, a pair of links for connecting the facing shoulders, said links having ball-ends fitting in said sockets, and a pair of coil springs disposed in diagonally opposite sockets back of the associated link end.

3. The combination in a coupling, of a pair of shaft collars, each having an arcuate ledge terminating in shoulders disposed on a chord adjacent the diameter, a pair of ball-ended links having their ends disposed in sockets within said ledges and each drivingly connected between the two collars, and a compression spring in the socket of the forward end of each link.

4. A coupling element comprising a shaft collar provided with a circular rim, an arcuate ledge on said rim terminating in shoulders located on a chord adjacent a diameter, a socket in each said shoulder, said sockets being equidistant from the center, one said socket having a coil spring and one end of a ball-ended link therein, and means to prevent egress of said link and spring from said socket, while permitting universal movement of said link.

5. The combination in a coupling of a pair of substantially identical shaft collars, lugs on said collars having shoulders facing each other and slightly spaced from each other, said shoulders being symmetrically arranged with respect to an axial plane, a pair of driving connections for establishing a power transmission between each shoulder on one said collar and the adjacent shoulder on the other collar, each said connection including link elements and a yielding portion, said driving connections being disposed symmetrically at opposite sides of an axial plane.

6. The combination in a coupling of a pair of substantially identical shaft collars, lugs on said collars having shoulders facing each other and slightly spaced from each other, said shoulders being symmetrically arranged with respect to an axial plane, a pair of driving connections for establishing a power transmission between each shoulder on one said collar and the adjacent shoulder on the other collar, each said connection including a ball-ended link fitting in corresponding sockets in said shoulders, and coil springs within certain of said sockets for yieldingly transmitting torque to or from the adjacent ball-ended link, said driving connections being disposed symmetrically at opposite sides of an axial plane.

In testimony whereof, I have signed my name to this specification this 27th day of January, 1920.

FREDERICK C. BARTON.